(12) United States Patent
Hudiono et al.

(10) Patent No.: US 8,019,936 B1
(45) Date of Patent: Sep. 13, 2011

(54) FAST DISK START SYSTEM

(75) Inventors: Lim Hudiono, Laguna Niguel, CA (US); Stanley K. Cheong, Lake Forest, CA (US); Daniel R. Pinvidic, San Juan Capistrano, CA (US)

(73) Assignee: Marvell International Ltd., Hamilton (BM)

( * ) Notice: Subject to any disclaimer, the term of this patent is extended or adjusted under 35 U.S.C. 154(b) by 413 days.

(21) Appl. No.: 11/985,490

(22) Filed: Nov. 15, 2007

Related U.S. Application Data

(60) Provisional application No. 60/910,926, filed on Apr. 10, 2007.

(51) Int. Cl.
*G06F 12/00* (2006.01)

(52) U.S. Cl. ............ 711/112; 711/113; 711/4; 711/200; 711/E12.019; 711/111; 714/5; 360/69

(58) Field of Classification Search .................. None
See application file for complete search history.

(56) References Cited

U.S. PATENT DOCUMENTS

| | | | | |
|---|---|---|---|---|
| 5,121,492 | A * | 6/1992 | Saville et al. | 703/13 |
| 2003/0081341 | A1* | 5/2003 | Wilson | 360/69 |
| 2003/0145164 | A1* | 7/2003 | Hoskins et al. | 711/112 |
| 2004/0148543 | A1* | 7/2004 | Eto et al. | 714/5 |
| 2004/0210711 | A1* | 10/2004 | Kakihara et al. | 711/112 |

FOREIGN PATENT DOCUMENTS

WO  WO 2005013271 A2 * 2/2005

* cited by examiner

*Primary Examiner* — Reginald Bragdon
*Assistant Examiner* — Arvind Talukdar

(57) ABSTRACT

A disk formatter (DF) for a rotating storage medium includes a target sector identification module that determines a block of target sectors of the rotating storage medium based on a read/write command signal. A current sector identification module determines a current sector of a read/write head. A DF control module begins a read/write operation at a command start sector that is different than a first sector of the block of target sectors. The command start sector is located within the block of target sectors.

57 Claims, 8 Drawing Sheets

FAST DISK START SYSTEM

CROSS-REFERENCE TO RELATED APPLICATIONS

This application claims the benefit of U.S. Provisional Application No. 60/910,926, filed on Apr. 10, 2007. The disclosure of the above application is incorporated herein by reference in its entirety.

FIELD

The present disclosure relates to rotating storage devices and systems, and more particularly to disk formatting, reading and writing to a rotating medium in a rotating storage device.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

The speed at which a rotating data storage device, such as a magnetic or an optical storage device, executes read and write operations affects the performance of a computer or other host device. A rotating data storage device may be, for example, a hard disk drive (HDD), a compact disc (CD) drive, a digital versatile disc (DVD) drive or a high definition/high data storage disc drive. Operational delay in the rotating data storage device can cause a corresponding delay in operation of the host device.

Typically, a HDD includes one or more magnetic disks. Each disk includes tracks that store data. The tracks are divided into sectors. A read/write head is used to read from or write to the sectors. The sectors are accessed serially beginning with a target start sector. An index pulse identifies the first sector of a track of a disk and a sector pulse identifies the start of a sector. In use, the HDD receives a command signal that identifies a target sector or a block of target sectors for a read/write operation. The HDD rotates the disk to the first target sector in the block of target sectors before proceeding with the read/write operation.

The read/write operation has associated delays. A delay occurs when the read/write head is not over a sector that is adjacent to and precedes the target start sector at the moment when the HDD is ready to perform the read/write operation. The delay is equal to the wait time for the disk to rotate to the target start sector. In certain instances, this delay can approach the amount of time required for one revolution of the disk.

The HDD performs preparation tasks prior to performing a read/write operation. These preparation tasks include determining the current sector that the read/write head is over. The rotating medium continues to rotate during the preparation tasks. As such, the disk may rotate past the target start sector before the HDD is ready to perform the read/write operation. For this reason, the associated delay can be longer than one revolution of the disk.

SUMMARY

In one embodiment, a disk formatter (DF) for a rotating storage medium is provided that includes a target sector identification module that determines a block of target sectors of the rotating storage medium based on a read/write command signal. A current sector identification module determines a current sector of a read/write head. A DF control module begins a read/write operation at a command start sector that is different than a first sector of the block of target sectors. The command start sector is located within the block of target sectors.

In other features, the command start sector is a valid sector. In other features, the command start sector is a non-defective/unmasked sector.

In still other features, the target sector identification module determines the block of target sectors based on a set of logical block addresses.

In other features, a buffer pointer is included that is adjusted to point at a target data position in a buffer memory associated with the current sector prior to the read/write operation. In other features, the DF control module reads from or writes to the buffer memory when executing the read/write operation.

In other features, the DF control module adjusts the command start sector based on a defective sector. In yet other features, the DF control module adjusts the command start sector based on an unmasked sector.

In still other features, the DF control module ends the read/write operation on an adjacent sector that is rotationally positioned prior to the command start sector. In other features, the adjacent sector is positioned prior to the command start sector relative to a track of the block of target sectors.

In further features, a latency signal generator is included that generates a latency signal. The DF control module adjusts the command start sector based on the latency signal. In other features, the latency signal generator generates the latency signal based on at least one parameter selected from a start sector calculation, a current sector, a defective sector, and a masked sector. In other features, the latency signal generator generates the latency signal based on time to load at least one of a target block register, a channel register, a buffer register, a defective sector register, and a latency register.

In yet other features, the DF control module pauses the read/write operation upon detecting a subsequent sector of a target end sector; continues the read/write operation upon detecting the first sector; and ends the read/write operation upon detecting the command start sector.

In still other features, a disk drive is provided and includes the disk formatter. In other features, the disk drive includes the read/write head. The DF control module performs the read/write operation via the read/write head. In other features, the disk drive further includes a buffer control module that controls access to a buffer. The DF control module is in communication with the buffer control module. In other features, the DF generates a data request signal. The buffer control module provides access to the buffer based on the data request signal.

In yet other features, a method of operating a disk formatter (DF) for a rotating storage medium is provided and includes determining a block of target sectors of the rotating storage medium based on a read/write command signal. A current sector of a read/write head is determined. A read/write operation begins at a command start sector that is different than a first sector of the block of target sectors. The command start sector is located within the block of target sectors.

In further features, the command start sector is a valid sector. In other features, the command start sector is a non-defective/unmasked sector.

In still other features, the method includes determining the block of target sectors based on a set of logical block addresses.

In other features, the method further includes adjusting a buffer pointer to point at a target data position in a buffer memory associated with the current sector prior to the read/write operation. In other features, the method includes reading from or writing to the buffer memory when executing the read/write operation.

In yet other features, the method includes adjusting the command start sector based on a defective sector. In other features, the method includes adjusting the command start sector based on an unmasked sector.

In further features, the method includes ending the read/write operation on an adjacent sector that is rotationally positioned prior to the command start sector. In other features, the adjacent sector is positioned prior to the command start sector relative to a track of the block of target sectors.

In still other features, the method further includes generating a latency signal. The command start sector is adjusted based on the latency signal. In other features, the method includes generating the latency signal based on at least one parameter selected from a start sector calculation, a current sector, a defective sector, and a masked sector. In other features, the method includes generating the latency signal based on time to load at least one of a target block register, a channel register, a buffer register, a defective sector register, and a latency register.

In yet other features, the method includes pausing the read/write operation upon detecting a subsequent sector of a target end sector. The read/write operation is continued upon detecting the first sector. The read/write operation ends upon detecting the command start sector.

In other features, the method includes performing the read/write operation via a read/write head.

In further features, the method further includes controlling access to a buffer. A data request signal is generated. Access to the buffer is provided based on the data request signal.

In still other features, a DF for a rotating storage medium is provided and includes target sector identification means for determining a block of target sectors of the rotating storage medium based on a read/write command signal. Current sector identification means for determining a current sector of a read/write head is included. DF control means for beginning a read/write operation at a command start sector that is different than a first sector of the block of target sectors is also included. The command start sector is located within the block of target sectors.

In other features, the command start sector is a valid sector. In yet other features, the command start sector is a non-defective/unmasked sector.

In still other features, the target sector identification means determines the block of target sectors based on a set of logical block addresses.

In further features, the DF further includes buffer pointing means for pointing at a target data position in a buffer memory associated with the current sector prior to the read/write operation. In other features, the DF control means reads from or writes to the buffer memory when executing the read/write operation.

In other features, the DF control means adjusts the command start sector based on a defective sector. In other features, the DF control means adjusts the command start sector based on an unmasked sector.

In still other features, the DF control means ends the read/write operation on an adjacent sector that is rotationally positioned prior to the command start sector. In other features, the adjacent sector is positioned prior to the command start sector relative to a track of the block of target sectors.

In yet other features, the DF further includes latency signal generating means for generating a latency signal. The DF control means adjusts the command start sector based on the latency signal. In other features, the latency signal generating means generates the latency signal based on at least one parameter selected from a start sector calculation, a current sector, a defective sector, and a masked sector. In other features, the latency signal generating means generates the latency signal based on time to load at least one of a target block register, a channel register, a buffer register, a defective sector register, and a latency register.

In still other features, the DF control means pauses the read/write operation upon detecting a subsequent sector of a target end sector; continues the read/write operation upon detecting the first sector; and ends the read/write operation upon detecting the command start sector.

In further features, a disk drive is provided that includes the disk formatter. In other features, the disk drive includes the read/write head. The DF control means performs the read/write operation via the read/write head. In other features, the disk drive further includes buffer control means for controlling access to a buffer. The DF control means is in communication with the buffer control means. In other features, the DF generates a data request signal. The buffer control means provides access to the buffer based on the data request signal.

In still other features, a DF for a rotating medium is provided and includes a target sector identification module that determines a block of target sectors based on a read/write command signal. A current sector identification module generates a current sector signal based on a current sector of a read/write head. A DF control module selects between a first sector of the block of target sectors and a command start sector. The DF control module begins a read/write operation on the selected sector, which is in the block of target sectors.

In other features, the command start sector is different from the target start sector and is in the block of target sectors. In yet other features, the command start sector is the same as the target start sector and is in the block of target sectors.

In other features, the DF control module selects between the target start sector and the command start sector based on whether the current sector is passed a target end sector. In still other features, the DF control module selects between the target start sector and the command start sector based on whether the current sector is passed the target start sector. In further features, the DF control module selects between the target start sector and the command start sector based on whether a current sector is between the target start sector and a target end sector.

In yet other features, the command start sector is a valid sector.

In other features, the target sector identification module determines the block of target sectors based on a set of logical block addresses.

In further features, the DF further includes a buffer pointer that is adjusted to point at a target data position in a buffer memory associated with the current sector prior to the read/write operation. In other features, the DF control module reads from or writes to the buffer memory when executing the read/write operation.

In still other features, the first valid sector is a non-defective/unmasked sector.

In other features, the DF control module adjusts the command start sector based on a defective sector. In yet other features, the DF control module adjusts the command start sector based on an unmasked sector. In further features, the DF control module ends the read/write operation on an adjacent sector that is rotationally positioned prior to the command start sector.

In still other features, the adjacent sector is positioned prior to the command start sector relative to a track of the block of target sectors.

In other features, the DF further includes a latency signal generator that generates a latency signal. The DF control module adjusts the command start sector based on the latency signal. In other features, the latency signal generator generates the latency signal based on at least one parameter selected from a start sector calculation, a current sector, a defective sector, and a masked sector. In other features, the latency signal generator generates the latency signal based on time to load at least one of a target block register, a channel register, a buffer register, a defective sector register, and a latency register.

In further features, the DF control module: pauses the read/write operation upon detecting a subsequent sector of a target end sector; continues the read/write operation upon detecting the target start sector; and ends the read/write operation upon detecting the command start sector.

In still other features, a disk drive is provided that includes the DF. In other features, the disk drive further includes the read/write head. The DF control module performs the read/write operation via the read/write head. In other features, the disk drive further includes a buffer control module that controls access to a buffer. The DF control module is in communication with the buffer control module. In other features, the DF generates a data request signal. The buffer control module provides access to the buffer based on the data request signal.

In yet other features, a method of operating a disk formatter (DF) for a rotating medium is provided and includes determining a block of target sectors based on a read/write command signal. A current sector signal is generated based on a current sector of a read/write head. A selection is made between a first sector of the block of target sectors and a command start sector. A read/write operation begins on the selected sector, which is in the block of target sectors.

In still other features, the command start sector is different from the target start sector and is in the block of target sectors. In other features, the command start sector is the same as the target start sector and is in the block of target sectors.

In further features, the method includes selecting between the target start sector and the command start sector based on whether the current sector is passed a target end sector.

In still other features, the method includes selecting between the target start sector and the command start sector based on whether the current sector is passed the target start sector.

In yet other features, the method includes selecting between the target start sector and the command start sector based on whether a current sector is between the target start sector and a target end sector.

In further features, the command start sector is a valid sector.

In other features, the method includes determining the block of target sectors based on a set of logical block addresses.

In still other features, the method further includes pointing at a target data position in a buffer memory associated with the current sector prior to the read/write operation. In other features, the method includes reading from or writing to the buffer memory when executing the read/write operation.

In further features, the first valid sector is a non-defective/unmasked sector.

In other features, the method includes adjusting the command start sector based on a defective sector. In other features, the method includes adjusting the command start sector based on an unmasked sector.

In still other features, the method includes ending the read/write operation on an adjacent sector that is rotationally positioned prior to the command start sector.

In further features, the adjacent sector is positioned prior to the command start sector relative to a track of the block of target sectors.

In yet other features, the method further includes: generating a latency signal; and adjusting the command start sector based on the latency signal. In other features, the method includes generating the latency signal based on at least one parameter selected from a start sector calculation, a current sector, a defective sector, and a masked sector. In other features, the method includes generating the latency signal based on time to load at least one of a target block register, a channel register, a buffer register, a defective sector register, and a latency register.

In still other features, the method includes: pausing the read/write operation upon detecting a subsequent sector of a target end sector; continuing the read/write operation upon detecting the target start sector; and ending the read/write operation upon detecting the command start sector.

In other features, the method further includes performing the read/write operation via the read/write head. The method further includes: controlling access to a buffer; generating a data request signal; and providing access to the buffer based on the data request signal.

In yet other features, a disk formatter (DF) for a rotating medium is provided and includes target sector identification means for determining a block of target sectors based on a read/write command signal. Current sector identification means for generating a current sector signal based on a current sector of a read/write head is included. DF control means for selecting between a first sector of the block of target sectors and a command start sector is also included. The DF control means begins a read/write operation on the selected sector, which is in the block of target sectors.

In still other features, the command start sector is different from the target start sector and is in the block of target sectors. In other features, the command start sector is the same as the target start sector and is in the block of target sectors.

In further features, the DF control means selects between the target start sector and the command start sector based on whether the current sector is passed a target end sector.

In still other features, the DF control means selects between the target start sector and the command start sector based on whether the current sector is passed the target start sector.

In other features, the DF control means selects between the target start sector and the command start sector based on whether a current sector is between the target start sector and a target end sector.

In yet other features, the command start sector is a valid sector.

In still other features, the target sector identification means determines the block of target sectors based on a set of logical block addresses.

In further features, buffer pointing means is included for pointing at a target data position in a buffer memory associated with the current sector prior to the read/write operation. In other features, the DF control means reads from or writes to the buffer memory when executing the read/write operation.

In other features, the first valid sector is a non-defective/unmasked sector.

In other features, the DF control means adjusts the command start sector based on a defective sector. In further features, the DF control means adjusts the command start sector based on an unmasked sector.

In still other features, the DF control means ends the read/write operation on an adjacent sector that is rotationally positioned prior to the command start sector.

In other features, the adjacent sector is positioned prior to the command start sector relative to a track of the block of target sectors.

In other features, the DF further includes latency signal generating means for generating a latency signal. The DF control means adjusts the command start sector based on the latency signal. In other features, the latency signal generating means generates the latency signal based on at least one parameter selected from a start sector calculation, a current sector, a defective sector, and a masked sector. In other features, the latency signal generating means generates the latency signal based on time to load at least one of a target block register, a channel register, a buffer register, a defective sector register, and a latency register.

In still other features, the DF control means: pauses the read/write operation upon detecting a subsequent sector of a target end sector; continues the read/write operation upon detecting the target start sector; and ends the read/write operation upon detecting the command start sector.

In yet other features, a disk drive is provided that includes the disk formatter. In other features, the disk drive further includes the read/write head. The DF control means performs the read/write operation via the read/write head. In other features, the disk drive further includes buffer control means for controlling access to a buffer. The DF control means is in communication with the buffer control means. In other features, the DF generates a data request signal. The buffer control means provides access to the buffer based on the data request signal.

In still other features, the systems and methods described above are implemented by a computer program executed by one or more processors. The computer program can reside on a computer readable medium such as but not limited to memory, non-volatile data storage and/or other suitable tangible storage mediums.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
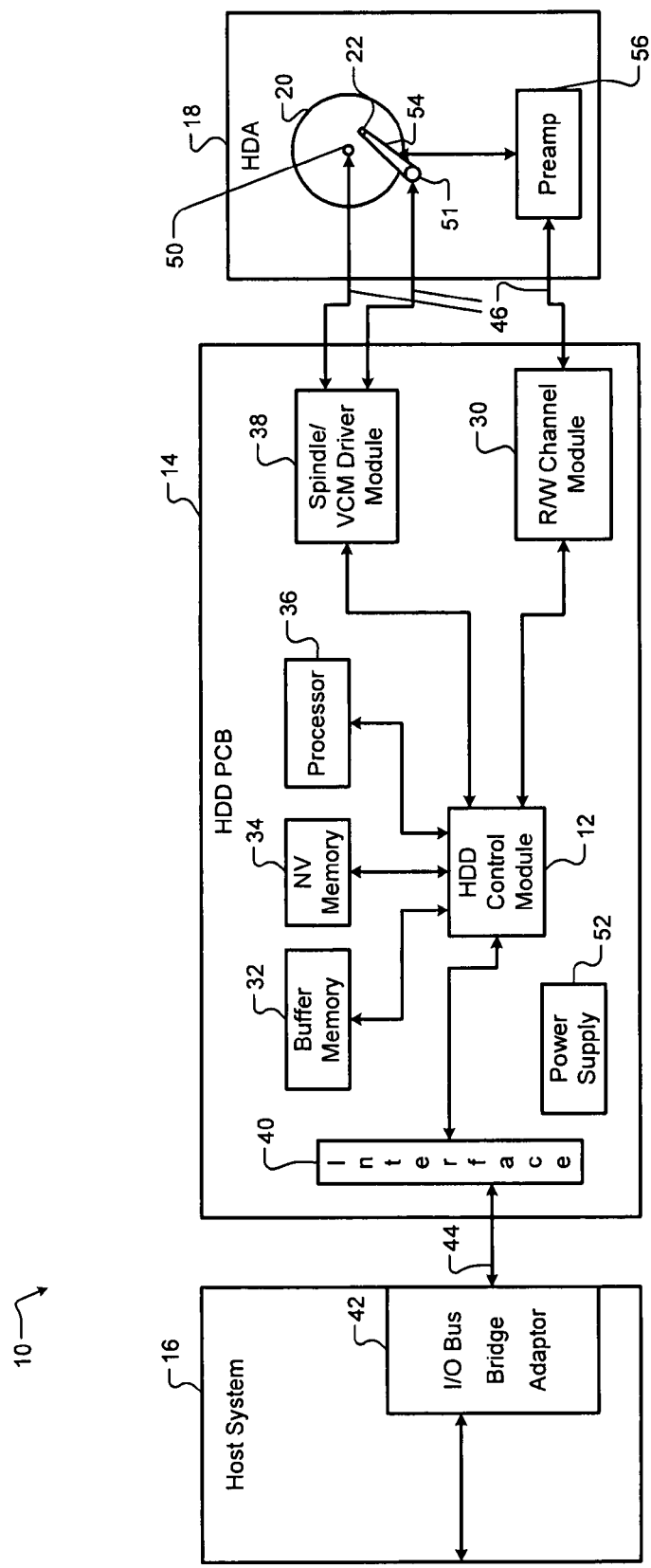
FIG. 1 is a functional block diagram of a hard disk drive system incorporating a hard disk drive control module in accordance with an embodiment of the present disclosure.

The following description is merely exemplary in nature and is in no way intended to limit the disclosure, its application, or uses. For purposes of clarity, the same reference numbers will be used in the drawings to identify similar elements. As used herein, the terms module and state machine refer to Application Specific Integrated Circuits (ASICs), electronic circuits, processors (shared, dedicated, or grouped) and memories that execute one or more software or firmware programs, combinational logic circuits, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present disclosure.

Referring now to FIG. 1, a functional block diagram of a hard disk drive (HDD) system 10 incorporating a HDD control module 12 in accordance with an embodiment of the present disclosure is shown. Although HDDs are primarily shown and described herein, the embodiments disclosed below may apply to other rotating data storage devices, such as a compact disc (CD) drive, a digital versatile disc (DVD) drive or a high definition/high data storage disc drive. The HDD system 10 includes a HDD printed circuit board (PCB) 14 that is coupled to a host system 16 and a hard disk assembly (HDA) 18. The HDD PCB 14 reads from and writes to sectors of a rotating storage medium 20 of the HDA 18 via the HDD control module 12. The read/write operations may be performed sequentially or in a different order depending upon the location of a read/write head 22 of the HDA 18, as will be described in detail below.

The HDD PCB 14 also includes a read/write channel module 30, a buffer memory 32, a nonvolatile memory 34, a processor 36, and a spindle/voice-coil motor (VCM) driver module 38. The read/write channel module 30 processes data received from and transmitted to the HDA 18. The HDD control module 12 controls components of the HDA 18 and communicates with an external device, such as the host system 16 via an I/O interface 40. The I/O interface 40 is in communication with an I/O bus bridge adaptor 42 of the host system 16 via an advanced technology attachment (ATA) bus 44. The host system 16 may include a computer, a multimedia device, a mobile computing device, etc. The I/O interface 40 may include wireline and/or wireless communication links.

The HDD control module 12 may receive data from the HDA 18, the read/write channel module 30, the buffer memory 32, the nonvolatile memory 34, the processor 36, the spindle/VCM driver module 38, and/or the I/O interface 40. The read/write channel module 30 and the spindle/VCM driver module 38 are in communication with the HDA 18 via HDA communication lines 46. The processor 36 may process the data, including encoding, decoding, filtering, and/or formatting. The processed data may be output to the HDA 18, the read/write channel module 30, the buffer memory 32, the nonvolatile memory 34, the processor 36, the spindle/VCM driver module 38, and/or the I/O interface 40.

The HDD control module 12 may use the buffer memory 32 and/or the nonvolatile memory 34 to store data related to the control and operation of the HDD 10. The buffer memory 32 may include dynamic random access memory (DRAM), synchronous DRAM (SDRAM), and/or other memory types. The nonvolatile memory 34 may include flash memory (including NAND and NOR flash memory), phase change memory, magnetic RAM, and/or multi-state memory, in which each memory cell has more than two states. The spindle/VCM driver module 38 controls a spindle motor 50 and a VCM 51. The HDD PCB 14 also includes a power supply 52 that provides power to the components of the HDD 10.

The HDA 18 includes the rotating storage medium 20. The HDA 18 further includes a read/write device, such as the read/write head 22. The read/write device may be arranged on an actuator arm 54, as shown, and read and write data on the rotating storage medium 20. Additionally, the HDA 18 includes the spindle motor 50 that rotates the rotating storage medium 20 and the VCM 51 that actuates the actuator arm 54. A preamplifier device 56 amplifies signals generated by the read/write device during read operations and provides signals to the read/write device during write operations.

Figure 2:
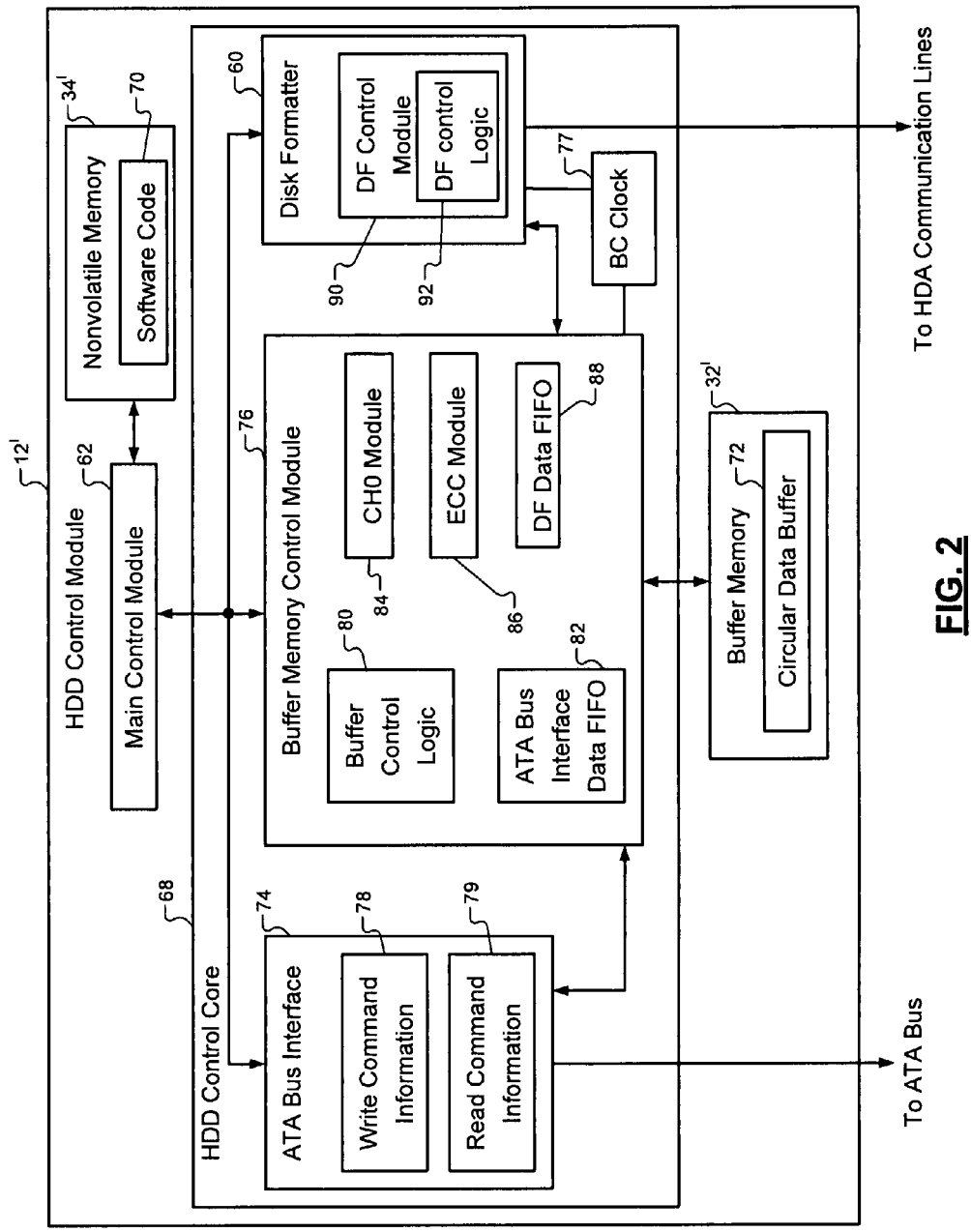
FIG. 2 is a functional block diagram of a hard disk drive control module incorporating a disk formatter in accordance with an embodiment of the present disclosure.

Referring to FIG. 2, a functional block diagram of a HDD control module 12' incorporating a disk format control module or disk formatter (DF) 60 in accordance with an embodiment of the present disclosure is shown. The HDD control module 12' includes a main control module 62, a buffer memory 32', a nonvolatile memory 34' and a HDD control core 68. The HDD control core 68 handles data flow between a host bus and HDA communication lines. The host bus may be the ATA bus 44 or other host bus, such as a small computer standard interface (SCSI) or a fibre channel port. The HDD control module 12' transfers data between a rotating medium and the buffer memory 32', transfers data between the buffer memory 32' and an ATA bus, and performs error correction and cyclical redundancy check (CRC) calculations.

The HDD control core 68 is controlled by the main control module 62, which executes software/firmware code 70 in the nonvolatile memory 34'. In addition to reading from and writing to a rotating medium, the main control module 62 handle tasks, such as moving a read/write head to a proper track and/or sector position.

The buffer memory 32' is used to buffer data between the rotating medium 20 and the ATA bus 44. This compensates for delays, latency, and timing differences between the rotating medium and the ATA bus. The buffer memory 32' includes a circular data buffer 72. The buffer memory 32' may include DRAM. In some configurations, the buffer memory 32' also serves as the memory for the main control module 62.

The HDD control core 68 includes an ATA bus interface 74 and a buffer memory control module 76, in addition to the DF 60. The HDD control core 68 also includes a buffer controller clock 77 that provides a clock signal to the DF 60 and the buffer memory control module 76. The buffer controller clock 77 may also provide the clock signal to the ATA bus interface 74. The ATA bus interface 74 implements ATA bus protocols to receive write command signals and read command signals having write command information 78 and read command information 79, respectively. The ATA bus interface 74 passes the write command information 78 and the read command information 79 to the buffer memory 32' through the buffer memory control module 76. The ATA bus interface 74 also has protocols for transmission of read data from a rotating medium to a host system.

The buffer memory control module 76 controls interleaved access to the buffer memory 32' by the DF 60, the ATA bus interface 74, and the main control module 76. The buffer memory control module 76 also arbitrates access of buffered data between the buffer memory 32' and the DF 60, the ATA bus interface 74, and the main control module 76. The buffer memory control module 76 includes buffer control logic 80, an ATA bus interface data first-in-first-out (FIFO) buffer 82, a channel (CH)0 module 84, an error correction code (ECC) module 86, and one or more disk channel or DF data FIFOs 88.

The buffer control logic 80 controls the functionality of the buffer control module 76. The ATA bus interface data FIFO 82 buffers data between the ATA bus interface 74 and the buffer memory 32'. The CH0 module 84 and the ECC module 86 are part of a disk channel, which may be referred to as a CH0. The disk channel facilitates data transfer between the buffer memory 32' and the rotating medium. The CH0 module 84 communicates with the buffer memory 32'. The ECC module 86 generates ECC bits, which are combined with received data prior to writing to the rotating medium. The ECC bits may be encoded prior to being written to a rotating medium and may be decoded upon being read from the rotating medium for error detection and correction purposes. The disk channel data FIFOs 88 buffer data between the buffer memory 32' and the DF 60 and may be part of the CH0 module 84 and/or the ECC module 86.

The DF 60 includes a DF control module 90 with DF control logic 92. The DF 60 controls the writing of data to a rotating storage medium. The DF 60 receives data from the buffer memory 32' through the buffer memory control module 76, formats the data, and sends the data to a read/write head. The DF may generate and send data request signals to the buffer memory control module 76. The buffer memory control module 76 provides data from the buffer memory 32' based on the data request signals. The DF 60 also monitors the sector of a track over which the read/write head is positioned to determine the proper timing and/or sending of the data to the read/write head. The functionality of the DF 60 is controlled by a disk control module.

Any of the control modules 62, 76, 84, 86, 90 of the HDD control module 12' may receive physical sector identification addresses and convert them to logical block addresses (LBAs). The LBAs may be converted to sector numbers and track numbers. The sector numbers and track numbers are stored. In one embodiment, the main control module 62 performs this task upon receiving command information. In another embodiment, the DF control module 90 performs this task.

Figure 3:
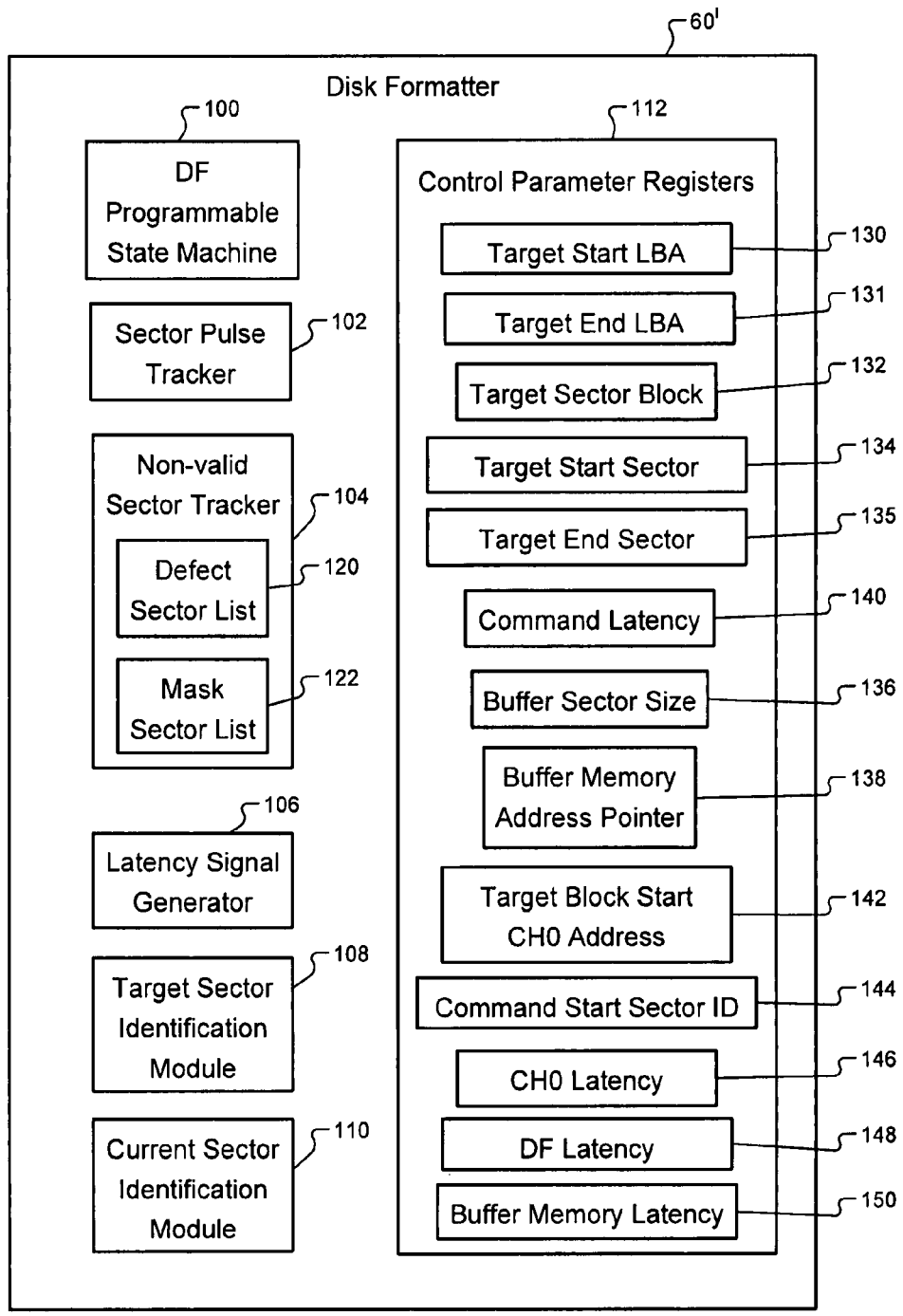
FIG. 3 is a block diagram of a disk formatter in accordance with an embodiment of the present disclosure.

Referring to FIG. 3, a block diagram of a DF 60' in accordance with an embodiment of the present disclosure is shown. The DF 60' includes a DF programmable state machine 100, which in general controls the operation of the DF 60'. The DF 60' also includes a sector pulse tracker 102, a non-valid sector tracker 104, a latency signal generator 106, a target sector identification module (TSIM) 108, a current sector identification module (CSIM) 110, and various control parameter registers 112. The sector pulse tracker 102, the non-valid sector tracker 104, the latency signal generator 106, the TSIM 108, and the CSIM 108 may be part of the DF state machine 100 or separate stand alone devices as shown. The sector pulse tracker 102, the defective sector tracker 104, the latency signal generator 106, the TSIM 108, and the CSIM 110 are in communication with, load, and adjust information contained in the control parameter registers 112.

The sector pulse tracker 102 detects sector pulses, which aid in identifying a current sector. When a read/write head passes over the beginning of a sector, that sector has an associated identification pulse that is generated and detected by the sector pulse tracker 102. The sector pulse tracker 102 may be used in tracking sector pulses for identification and detection of a target sector. The sector pulse tracker 102 may perform tasks based on format tables.

The non-valid sector tracker 104 includes a defective list 120 and/or a masked list 122. The defective sector list 120 includes identification addresses, sector numbers and/or track numbers of defective sectors. The masked sector list 122 includes identification addresses, sector numbers and/or track numbers of sectors that have been masked. A valid sector is a sector that is not defective or masked. A sector may be masked when the sector is defective, contains an error, or for some other reason. When a sector is masked, the sector is skipped or ignored, such that the sector is not involved in a read/write operation.

The latency signal generator 106 generates a latency signal. The latency signal is associated with the lead time or preparation time to perform a read/write operation to a rotating medium. The extent of the preparation time is referred to as the preparation period. The preparation period may include calculation time, register load time, data transfer time, etc. The preparation period may include time to determine a current sector, time to load control parameter information into registers, and time to load data into a buffer. When in the read/write ready mode the DF is ready to read from or write to a rotating medium upon detection of a target start sector and/or a command start sector. A target start sector refers to a first sector in a block of target sectors on which to perform a read/write operation, relative to the corresponding track. A command start sector refers to a sector within a block of target sectors on which to start a read/write operation. The command start sector may be any non-defective/non-masked sector in a track including the target start sector. The embodiments of the present disclosure allow for the beginning of a read/write operation on a command start sector as opposed to the target start sector.

The TCIM 108 determines the block of target sectors to perform a read/write operation. The TCIM 108 may receive command signals, such as from a HDD control module, a host system control module, or elsewhere, and based thereon determine a set of desired sectors on which to perform the read/write operation. The TCIM 108 may convert LBAs into sector and track numbers. The TCIM 108 may determine the appropriate target sectors based on information in the defective sector list and the masked sector list.

The CSIM 110 determines the current sector over which a read/write head is positioned. The CSIM 110 may determine the current sector based on information received from the sector pulse tracker.

The control parameter registers 112 include a target start LBA register 130, a target end LBA register 131, a target sector block register 132, a target start sector register 134, a target end sector register 135, a buffer sector size register 136, a buffer memory address pointer register 138, a command latency register 140, and other registers. The control parameter registers 112 may also include a target block start CH0 address register 142, a command start sector ID register 144, a CH0 latency register 146, a DF latency register 148 and a buffer memory latency register 150. Note that the defective sector list 120 and the masked sector list 122 may have corresponding registers. The control parameter registers 112 may also include skip sector registers associated with defective sectors or masked sectors, such as that in the defective list 120 and the masked list 122. In one embodiment, the stated registers are loaded during the preparation period and the time associated therewith is determined. The preparation period time is used to generate a command start sector.

The target start LBA 130 register contains the LBA of the first sector of the block of target sectors. The target end LBA register 131 contains the LBA of the last sector of the block of target sectors. The target sector block register 132 contains a target sector count or the number of target sectors on which a read/write operation is to be performed. The target start sector register 134 contains the sector identification number of the target start sector. The target end sector register 135 contains the sector identification number of the target start sector. The buffer sector size register 136 contains the size of the allocated memory within the buffer that is associated with the sector or block of sectors of interest. The buffer memory address pointer register 138 contains the address of the allocated or corresponding memory location in the buffer that is associated with the sector or block of sectors of interest. The buffer memory latency register 150 contains buffer memory response delay that is associated with receiving a request and responding with data for that request.

The command latency register 140 contains the command latency period to wait prior to performing a read/write operation. A latency period may be related to a number of sector pulses. There is an associated time frame for each sector of a rotating medium to pass under a read/write head. This time frame depends on the rotating speed of the disk drive. The command latency period includes CH0 latency, DF latency, and any buffer memory response latency. The CH0 latency register 146 has the CH0 delay, which may be measured in one sector time. The CH0 delay is the time between when a CH0 module, such as the CH0 module 84, receives a DF command to get data from a buffer memory and when the CH0 module is ready with the data. CH0 latency is zero for disk read operations. As an example, the CH0 latency may be equivalent to the time for five sectors to rotate past a read/write head.

The DF latency register 148 has the DF delay, which is measured in one sector time. The DF delay is equal to the time when the DF 60' receives a fast disk start command to the time when the DF 60' issues a command to the CH0 module. A fast disk start command refers to a command that requests a read/write operation that may begin with a non-target start sector. The above-described latencies may vary per application.

The target block start CH0 address register 142 contains the buffer starting address of the target data block. The command start sector ID register 144 has the actual sector ID on which to begin execution of a command.

The read/write operations may be performed using fast disk start tasks. The fast disk start tasks allow a disk read/write operation to be performed generally anytime the read/write heads of a rotating data storage drive is positioned over target sectors or is within a latency period of a target start sector. When starting a read/write operation over a target sector that is different from a target start sector, the read/write operation is split into two partial read/write operations. Each read/write operation is associated with a section of the target sectors. The first read/write operation starts at the current head position plus any associated latency and read/writes until the target block end. The second read/write operation continues the operation from the target block start until the start sector of the first section. Defective or masked sectors are accounted for in performing fast disk start tasks by reading the defective list 120, the masked list 122, skip sector registers and/or the CH0 latency register when providing disk write data. This is described in further detail below with respect to the example embodiments of FIGS. 4-7 including steps to calculate the correct starting sector and LBA values.

Figure 4:
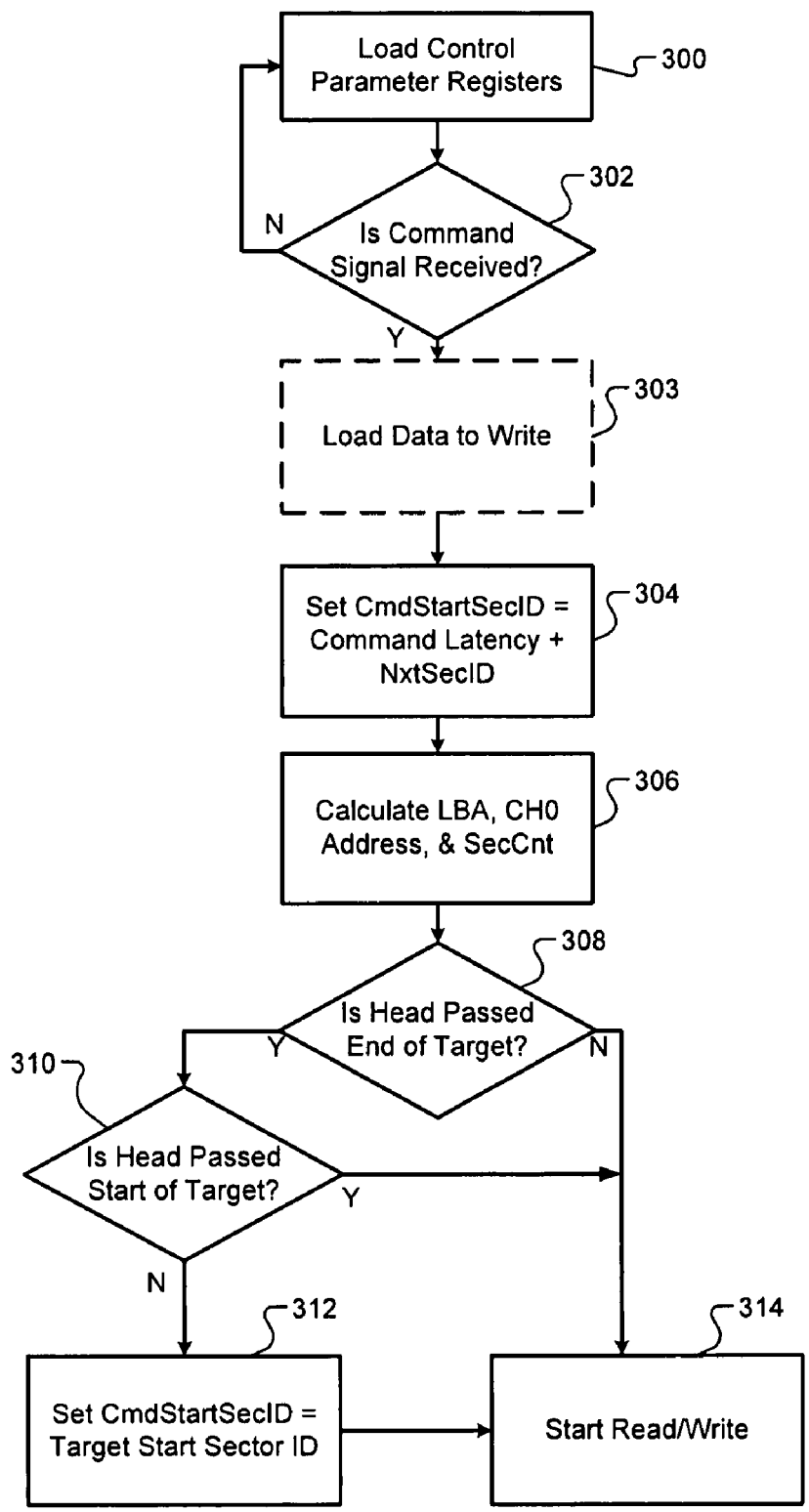
FIG. 4 is a logic flow diagram illustrating a method of performing a read/write operation on a rotating medium in accordance with an embodiment of the present disclosure.

Referring to FIG. 4, a logic flow diagram illustrating a method of performing a read/write operation on a rotating medium, such as the rotating medium 20 in accordance with an embodiment of the present disclosure is shown. Although the following steps are described primarily with respect to the embodiments of FIGS. 1-3, they may be easily modified for other embodiments of the present invention.

In step 300, DF control parameter registers are loaded, such as the DF control parameter registers 112. In step 302, a DF state machine, such as the DF programmable state machine 100, receives a command signal to perform a read/write operation. When a command signal is received the DF state machine proceeds to step 304, otherwise it returns to step 300. The command signal may be generated via a main control module, a buffer memory control module, and/or by a host system, such as the main control module 62, the buffer memory control module 76, and the host system 16.

In step 303, when a write operation is performed a buffer memory, such as the buffer memory 32', is load with the data to be written prior to the start of the write operation. Step 303 must be performed prior to receiving the command signal.

In step 304, the DF state machine determines a command start sector ID, which is the ID of the next sector closest to the current head position taking into account the command latency. A command start sector identification number is set equal to a next sector identification number plus a command latency sector equivalent amount. The next sector identification number is equal to a current sector identification number plus one. The next sector identification number may be incremented for each defective sector and/or masked sector corresponding to a given next sector identification number. The command latency sector equivalent amount is equal to the number of sectors that rotate by a read/write head over the command latency time. In other words, the DF state machine estimates the command start sector ID, which is the sum of the current sector ID and the command latency. The DF state machine checks whether the command start sector ID is or is not on the target zone or target sectors.

In step 306, the DF state machine calculates a LBA and a CH0 address of the command start sector ID and a target sector count. The target sector count is equal to the number of sectors remaining and on which a read/write operation is to be performed. The DF state machine in determining the command start sector ID and in calculating the LBA and CH0 address also accounts for defective and/or masked sectors. The command start sector ID may be incremented for each defective and/or masked sector located in a determined command start location.

In step 308, when a read/write head, such as the read/write head, passes a target end sector, the DF state machine proceeds to step 310, otherwise it proceeds to step 314. In step 310, when the read/write head passes a target start sector, the DF state machine proceeds to step 314, otherwise it proceeds to step 312.

In step 312, the DF state machine sets the command start sector ID equal to the target start sector ID. In step 314, the DF state machine starts a read/write operation either on the command start sector which is set in step 303 or in step 312, depending if the read/write head is over the target start sectors or not over the target start sectors, respectively.

The above-described steps are meant to be illustrative examples; the steps may be performed sequentially, synchronously, simultaneously, or in a different order depending upon the application.

As a further example, when the read/write head is not over the target sectors, the DF state machine in effect starts from the target block start sector ID and proceeds toward the command start sector ID. For each non-defective and/or non-masked sector, the DF state machine increments the determined LBA by one, increments the CH0 address of a target start block by the sector size, and decrements the sector count by one. The DF state machine continues until it reaches the end of sector zone or section of interest (sector count equal to zero). When the DF state machine reaches the end of the section, the read/write operation is paused until the read/write head is over the target block start sector ID. In this case, the command start sector ID is set to the target block start sector ID. When the DF state machine reaches the command start sector ID and the sector count is larger than zero, then the DF state machine starts with the command start sector ID.

As an example, the state machine may take 2 to 3 buffer controller clock cycles to process each sector from the target block start sector ID to the target block end sector ID. When there are 2000 sectors in between the target block start sector ID to the target block end sector ID, then the DF state machine may take approximately 4000 to 6000 buffer controller clock cycles to determine the command start sector ID.

Figure 5:
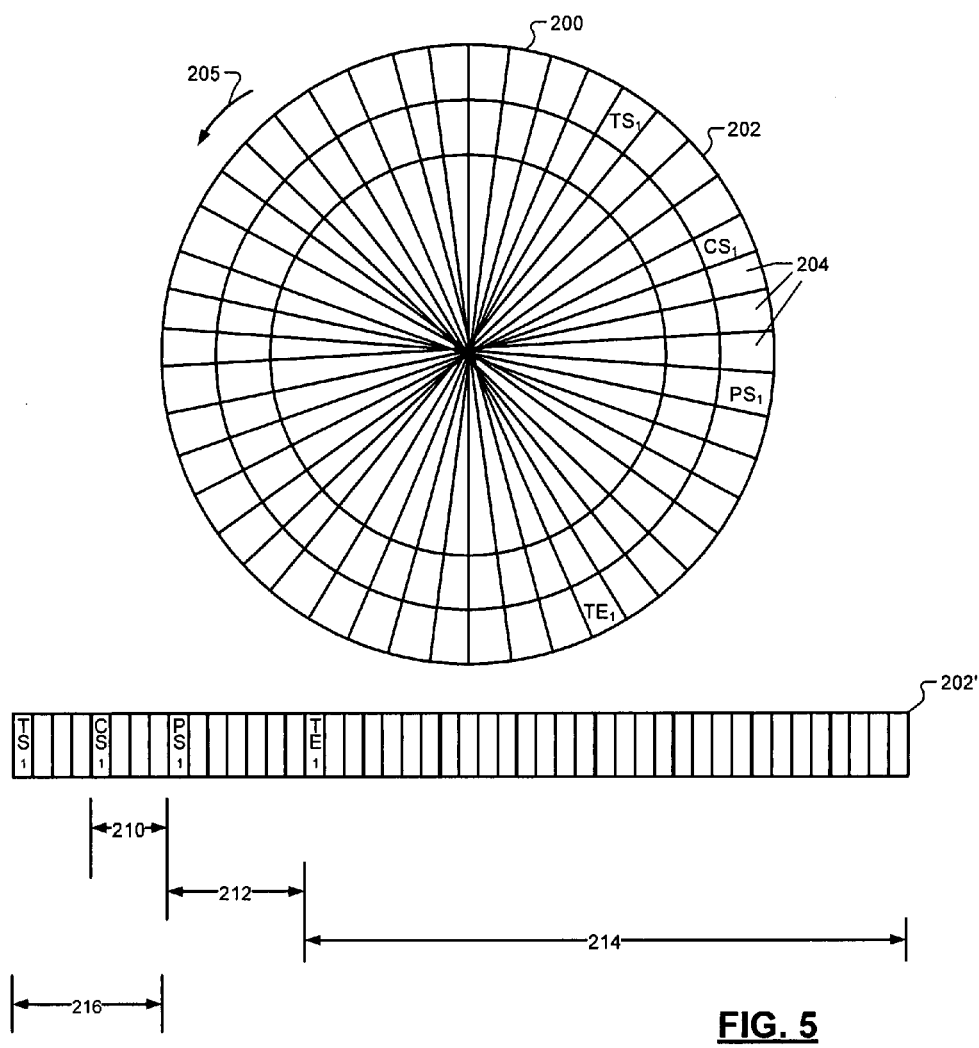
FIG. 5 is a rotating medium sector diagram illustrating an example read/write operation in accordance with an embodiment of the present disclosure.

Referring to FIG. 5, a rotating medium sector diagram illustrating an example read/write operation in accordance with an embodiment of the present disclosure is shown. A top view of a rotating medium 200 with a track 202 of sectors 204 is shown. The rotating medium 200 is rotating counter-clockwise, as indicated by arrow 205. The track 202 is also shown in a serial/linear format 202'. A target start sector $TS_1$, a target end sector $TE_1$, a current sector $CS_1$, and a command start sector $PS_1$ are called out. A latency period 210, a first write period 212, a wait period 214, and a second write period 216 are also shown.

In the sample read/write operation shown, the read/write head is over the current sector CS. Due to the latency, as above-described, a command start sector is four sectors subsequent to the current sector $CS_1$. The read/write head writes to the rotating medium 200 starting in the command start sector $PS_1$, writes until the target end sector $TE_1$, pauses while the rotating medium 200 is rotated to the target start sector $TS_1$, and continues writing until detection of the command start sector $PS_1$.

Figure 6:
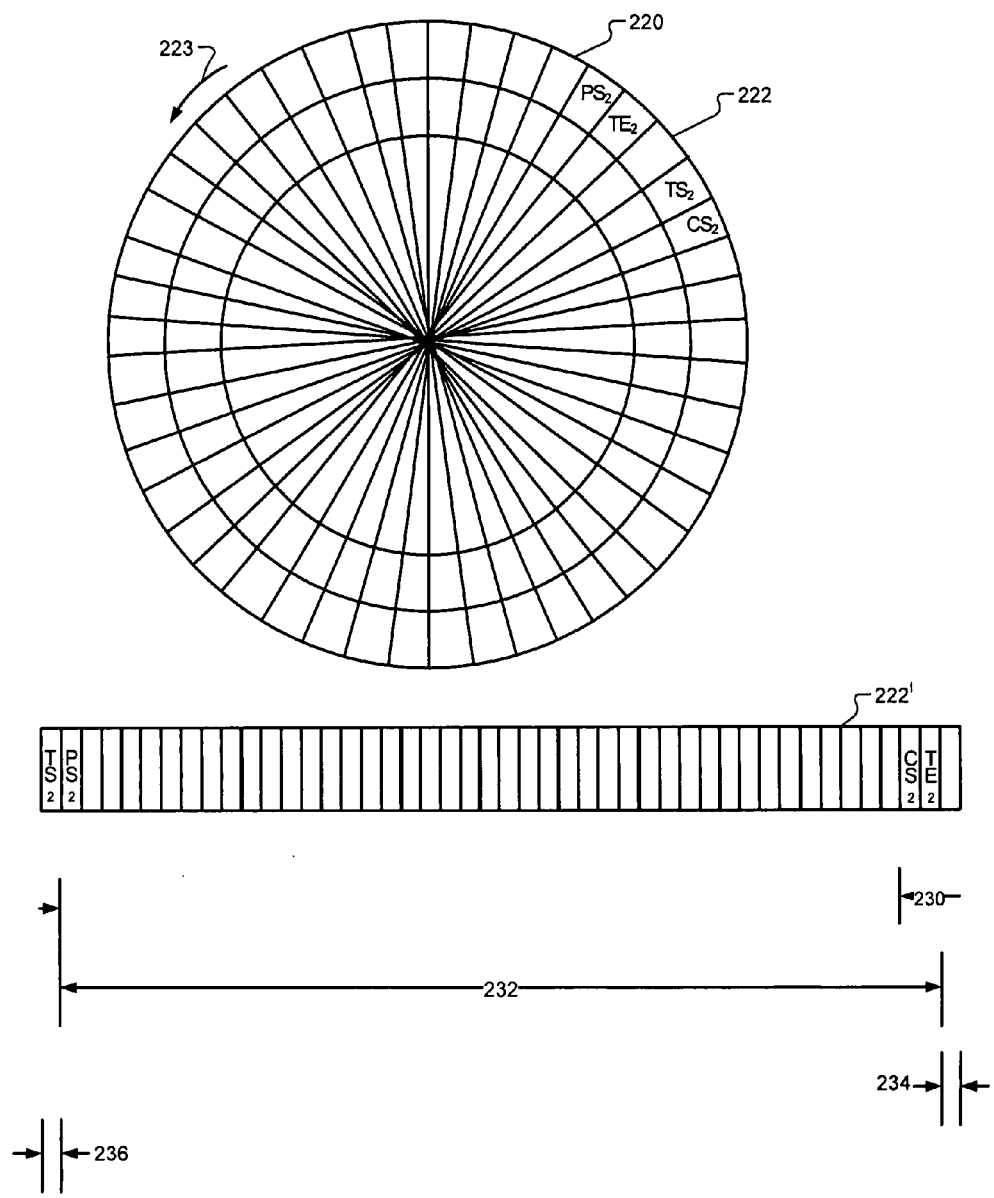
FIG. 6 is a rotating medium sector diagram illustrating another example read/write operation in accordance with an embodiment of the present disclosure.

Referring to FIG. 6, a rotating medium sector diagram illustrating another example read/write operation in accordance with an embodiment of the present disclosure is shown. Similar to FIG. 5, a rotating medium 220 with a track 222 and a serial/linear format 222' are shown. The rotating medium 200 is rotating counter-clockwise, as indicated by arrow 223. A target start sector $TS_2$, a target end sector $TE_2$, a current sector $CS_2$, and a command start sector $PS_2$ are called out. A latency period 230, a first write period 232, a wait period 234 and a second write period 236 are also shown. In the sample read/write operation shown, the read/write head is over the current sector $CS_2$. Due to the latency, as above-described, a command start sector is four sectors subsequent to the current sector $CS_2$. The read/write head writes to the rotating medium starting in the command start sector $PS_2$, writes until the target end sector $TE_2$, skips a sector while the rotating medium is rotated to the target start sector $TS_2$, and continues writing until the following sector or the command start sector.

Figure 7:
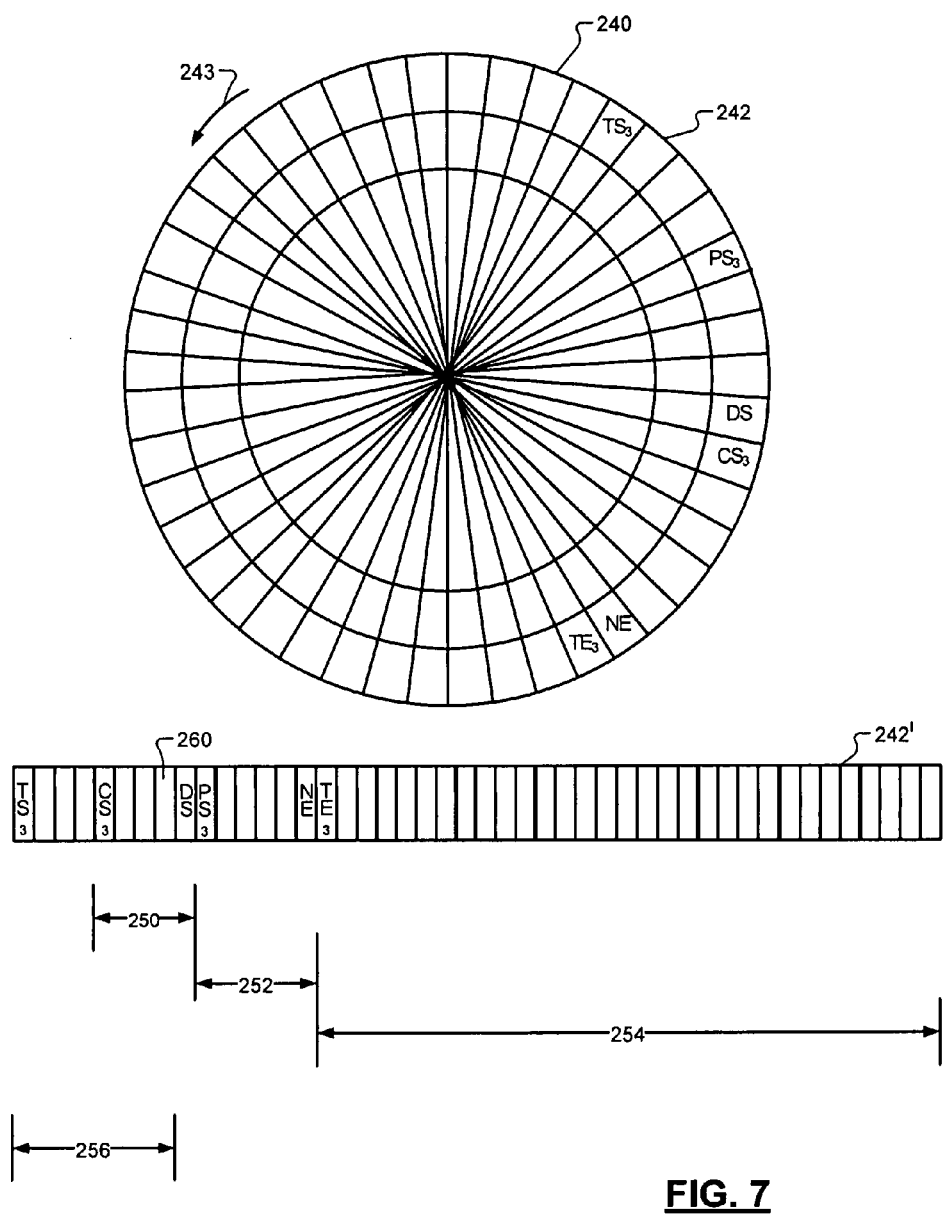
FIG. 7 is a rotating medium sector diagram illustrating yet another example read/write operation in accordance with an embodiment of the present disclosure.

Referring to FIG. 7, a rotating medium sector diagram illustrating yet another example read/write operation in accordance with an embodiment of the present disclosure is shown. Similar to FIGS. 5 and 6, a rotating medium 240 with a track 242 and a serial/linear format 242' are shown. The rotating medium 200 is rotating counter-clockwise, as indicated by arrow 243. A target start sector $TS_3$, a target end sector $TE_3$, a current sector $CS_3$, and a command start sector $PS_3$ are called out. In addition, a defective sector DS and a normal end without defect sector NE are called out. A latency period 250, a first write period 252, a wait period 254 and a second write period 256 are shown.

In the sample read/write operation shown, the read/write head is over the current sector $CS_3$. Due to the latency, as above-described, a normal command start sector is four sectors subsequent to the current sector $CS_3$. However, since the normal current start sector has a sector number that matches that of the defective sector DS, the current start sector $PS_3$ is five sectors subsequent to the current sector $CS_3$. The read/write head writes from the current start sector $PS_3$ to the target end sector $TE_3$, which is one sector past the normal end without defect sector NE. Operation of the read/write head is paused while the rotating medium is rotated to the target start sector $TS_3$, and continues writing until the read/write head reaches the end of the sector 260 precedent and adjacent to the defective sector DS.

The embodiments disclosed herein reduce the negative effect of rotational latency by allowing disk operation to start sooner or when a read/write head is over any portion of a target sector set.

Figure 8:
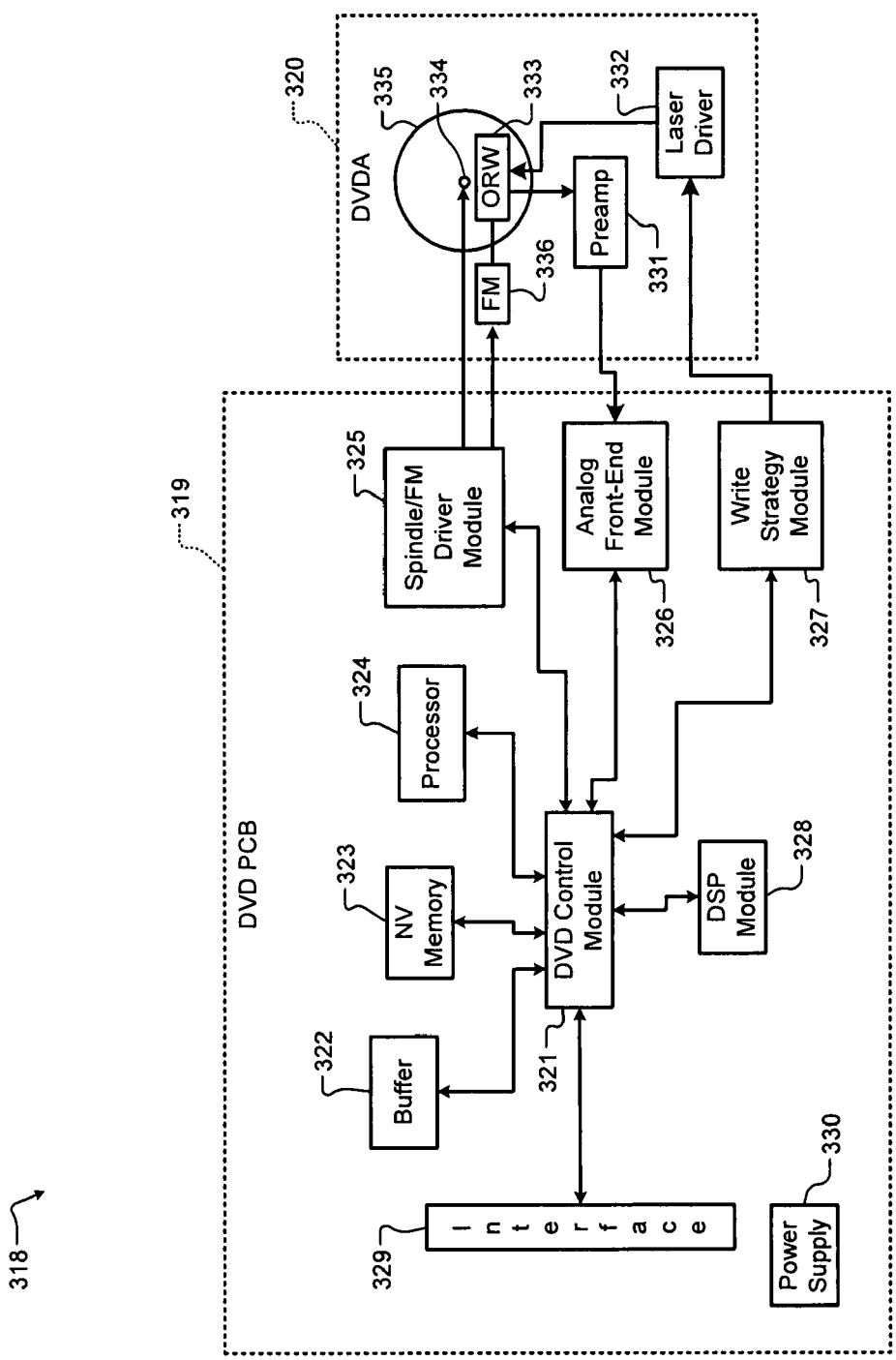
FIG. 8 is a functional block diagram of a DVD drive.

Referring now to FIG. 8, a functional block diagram of a DVD drive is shown. The teachings of the disclosure can be implemented in a DVD control module 321 of a DVD drive 318 or of a CD drive (not shown). The DVD control module 321 may perform a read or write operation as above described. The DVD drive 318 includes a DVD PCB 319 and a DVD assembly (DVDA) 320. The DVD PCB 319 includes a DVD control module 321, a buffer 322, nonvolatile memory 323, a processor 324, a spindle/FM (feed motor) driver module 325, an analog front-end module 326, a write strategy module 327, and a DSP module 328.

The DVD control module 321 controls components of the DVDA 320 and communicates with an external device (not shown) via an I/O interface 329. The external device may include a computer, a multimedia device, a mobile computing device, etc. The I/O interface 329 may include wireline and/or wireless communication links.

The DVD control module 321 may receive data from the buffer 322, nonvolatile memory 323, the processor 324, the spindle/FM driver module 325, the analog front-end module 326, the write strategy module 327, the DSP module 328, and/or the I/O interface 329. The processor 324 may process the data, including encoding, decoding, filtering, and/or formatting. The DSP module 328 performs signal processing, such as video and/or audio coding/decoding. The processed data may be output to the buffer 322, nonvolatile memory 323, the processor 324, the spindle/FM driver module 325, the analog front-end module 326, the write strategy module 327, the DSP module 328, and/or the I/O interface 329.

The DVD control module 321 may use the buffer 322 and/or nonvolatile memory 323 to store data related to the control and operation of the DVD drive 318. The buffer 322 may include DRAM, SDRAM, etc. The nonvolatile memory 323 may include flash memory (including NAND and NOR flash memory), phase change memory, magnetic RAM, or multi-state memory, in which each memory cell has more than two states. The DVD PCB 319 includes a power supply 330 that provides power to the components of the DVD drive 318.

The DVDA 320 may include a preamplifier device 331, a laser driver 332, and an optical device 333, which may be an optical read/write (ORVV) device or an optical read-only (OR) device. A spindle motor 334 rotates an optical storage medium 335, and a feed motor 336 actuates the optical device 333 relative to the optical storage medium 335.

When reading data from the optical storage medium 335, the laser driver provides a read power to the optical device 333. The optical device 333 detects data from the optical storage medium 335, and transmits the data to the preamplifier device 331. The analog front-end module 326 receives data from the preamplifier device 331 and performs such functions as filtering and ND conversion. To write to the optical storage medium 335, the write strategy module 327 transmits power level and timing data to the laser driver 332. The laser driver 332 controls the optical device 333 to write data to the optical storage medium 335.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A disk formatter for a rotating storage medium, the disk formatter comprising:
   a target sector identification module configured to determine a block of target sectors of the rotating storage medium based on a read/write command signal;
   a current sector identification module configured to determine a current sector corresponding to a current position of a read/write head on a track of the rotating storage medium;
   a latency signal generator configured to determine a latency period from the current sector to begin a read/write operation on the track, wherein the latency period is equal to X sectors in length, where X is an integer; and
   a control module configured to begin the read/write operation at a command start sector based on the latency period, wherein the command start sector is (i) different than a first sector of the block of target sectors, (ii) located within the block of target sectors, (iii) on the track, and (iv) the X sectors away from the current sector,
   wherein the control module is configured to end the read/write operation on a sector that is rotationally positioned adjacent and prior to the command start sector, and
   wherein the control module is configured to end the read/write operation based on detection of the command start sector and subsequent to at least one of (i) reading from each of the target sectors or (ii) writing to each of the target sectors.

2. The disk formatter of claim 1, wherein the command start sector is a valid sector.

3. The disk formatter of claim 1, wherein the command start sector is a non-defective and unmasked sector.

4. The disk formatter of claim 1, wherein the target sector identification module is configured to determine the block of target sectors based on a set of logical block addresses.

5. The disk formatter of claim 1, further comprising a buffer pointer that is adjusted to point at a target data position of the current sector in a buffer memory prior to the read/write operation.

6. The disk formatter of claim 5, wherein the control module is configured to read from or write to the buffer memory when executing the read/write operation.

7. The disk formatter of claim 1, wherein the control module is configured adjust the command start sector based on a defective sector.

8. The disk formatter of claim 1, wherein the control module is configured to adjust the command start sector based on an unmasked sector.

9. The disk formatter of claim 1, wherein:
the sector that is rotationally positioned adjacent and prior to the command start sector is included in the track; and
the track includes the block of target sectors.

10. The disk formatter of claim 1, wherein the latency signal generator is configured to determine the latency period based on at least one parameter selected from a start sector, a current sector, a defective sector, or a masked sector.

11. The disk formatter of claim 1, wherein the latency signal generator is configured to determine the latency period based on time to load at least one of a target block register, a channel register, a buffer register, a defective sector register, or a latency register.

12. The disk formatter of claim 1, wherein the control module is configured to:
pause the read/write operation upon detecting a sector subsequent to a target end sector of the block of target sectors; and
continue the read/write operation upon detecting the first sector.

13. A disk drive that includes the disk formatter of claim 1.

14. The disk drive of claim 13, further comprising the read/write head,
wherein the control module is configured to perform the read/write operation via the read/write head.

15. The disk drive of claim 13, further comprising a buffer control module configured to control access to a buffer,
wherein the control module is in communication with the buffer control module.

16. The disk drive of claim 15 wherein:
the disk formatter is configured to generate a data request signal; and
the buffer control module is configured to provide access to the buffer based on the data request signal.

17. A method of operating a disk formatter for a rotating storage medium, the method comprising:
determining a block of target sectors of the rotating storage medium based on a read/write command signal;
determining a current sector corresponding to a current position of a read/write head on a track of the rotating storage medium;
determining a latency period from the current sector to begin a read/write operation on the track, wherein the latency period is equal to X sectors in length, where X is an integer;
based on the latency period, beginning the read/write operation at a command start sector that is (i) a different than a first sector of the block of target sectors, (ii) located within the block of target sectors, (iii) on the track, and (iv) the X sectors away from the current sector; and
based on detection of the command start sector and subsequent to at least one of (i) reading from each of the target sectors or (ii) writing to each of the target sectors, ending the read/write operation on a sector that is rotationally positioned adjacent and prior to the command start sector.

18. The method of claim 17, wherein the command start sector is a valid sector.

19. The method of claim 17, wherein the command start sector is a non-defective and unmasked sector.

20. The method of claim 17, comprising determining the block of target sectors based on a set of logical block addresses.

21. The method of claim 17, further comprising adjusting a buffer pointer to point at a target data position of the current sector in a buffer memory prior to the read/write operation.

22. The method of claim 21, further comprising reading from or writing to the buffer memory when executing the read/write operation.

23. The method of claim 17, further comprising adjusting the command start sector based on a defective sector.

24. The method of claim 17, further comprising adjusting the command start sector based on an unmasked sector.

25. The method of claim 17, wherein:
the sector that is rotationally positioned adjacent and prior to the command start sector is included in the track; and
the track includes the block of target sectors.

26. The method of claim 17, further comprising adjusting the command start sector based on the latency period.

27. The method of claim 26, further comprising determining the latency period based on at least one parameter selected from a start sector, a current sector, a defective sector, or a masked sector.

28. The method of claim 26, further comprising determining the latency period based on time to load at least one of a target block register, a channel register, a buffer register, a defective sector register, or a latency register.

29. The method of claim 17, further comprising:
pausing the read/write operation upon detecting a sector subsequent to a target end sector of the block of target sectors; and
continuing the read/write operation upon detecting the first sector.

30. The method of claim 17, further comprising performing the read/write operation via a read/write head.

31. The method of claim 17, further comprising:
controlling access to a buffer;
generating a data request signal; and
providing access to the buffer based on the data request signal.

32. A disk formatter for a rotating storage medium, the disk formatter comprising:
target sector identification means for determining a block of target sectors of the rotating storage medium based on a read/write command signal;
current sector identification means for determining a current sector corresponding to a current position of a read/write head on a track;
latency signal generator means for determining a latency period from the current sector to begin a read/write operation on the track, wherein the latency period is equal to X sectors in length, where X is an integer; and
control means for beginning the read/write operation at a command start sector based on the latency period, wherein the command start sector is (i) different than a first sector of the block of target sectors, (ii) located within the block of target sectors, (iii) on the track, and (iv) the X sectors away from the current sector,
wherein the control means ends the read/write operation on a sector that is rotationally positioned adjacent and prior to the command start sector, and
wherein the control means ends the read/write operation based on detection of the command start sector and subsequent to at least one of (i) reading from each of the target sectors or (ii) writing to each of the target sectors.

33. The disk formatter of claim 32, wherein the command start sector is a valid sector.

34. The disk formatter of claim 32, wherein the command start sector is a non-defective and unmasked sector.

35. The disk formatter of claim 32, wherein the target sector identification means determines the block of target sectors based on a set of logical block addresses.

36. The disk formatter of claim 32, further comprising buffer pointing means for pointing at a target data position of the current sector in a buffer memory prior to the read/write operation.

37. The disk formatter of claim 36, wherein the control means reads from or writes to the buffer memory when executing the read/write operation.

38. The disk formatter of claim 32, wherein the control means adjusts the command start sector based on a defective sector.

39. The disk formatter of claim 32, wherein the control means adjusts the command start sector based on an unmasked sector.

40. The disk formatter of claim 32, wherein:
the sector that is rotationally positioned adjacent and prior to the command sector is included in the track; and
the track includes the block of target sectors.

41. The disk formatter of claim 32, wherein the control means adjusts the command start sector based on the latency period.

42. The disk formatter of claim 41, wherein the latency signal generating means determine the latency period based on at least one parameter selected from a start sector, a current sector, a defective sector, or a masked sector.

43. The disk formatter of claim 41, wherein the latency signal generating means determines the latency period based on time to load at least one of a target block register, a channel register, a buffer register, a defective sector register, or a latency register.

44. The disk formatter of claim 32, wherein the control means:
pauses the read/write operation upon detecting a sector subsequent to a target end sector of the block of target sectors; and
continues the read/write operation upon detecting the first sector.

45. A disk drive that includes the disk formatter of claim 32.

46. The disk drive of claim 45, further comprising the read/write head,
wherein the control means performs the read/write operation via the read/write head.

47. The disk drive of claim 45, further comprising buffer control means for controlling access to a buffer,
wherein the control means is in communication with the buffer control means.

48. The disk drive of claim 47, wherein:
the disk formatter generates a data request signal; and
the buffer control means provides access to the buffer based on the data request signal.

49. The disk formatter of claim 12, further comprising:
during the pausing of the read/write operation, (i) skipping non-target sectors between a last sector of the block of target sectors and the first sector of the block of target sectors and (ii) rotating the rotating storage medium to the first sector of the block of target sectors;
continuing the read/write operation at the first sector of the block of target sectors; and
ending the read/write operation at the sector rotationally positioned adjacent and prior to the command start sector.

50. The disk formatter of claim 1, wherein the latency period comprises at least one of:
a channel latency defined as a period between (i) when a channel module receives a disk formatter command to get data from a buffer memory and (ii) when the channel module is ready with the data;
a disk formatter latency defined as a period between (i) when a disk formatter receives a disk start command and (ii) when the disk formatter issues a command to a channel module; or
a buffer memory response latency.

51. The disk formatter of claim 1, wherein the latency period comprises:
a channel latency defined as a period between (i) when a channel module receives a disk formatter command to get data from a buffer memory and (ii) when the channel module is ready with the data;
a disk formatter latency defined as a period between (i) when a disk formatter receives a disk start command and (ii) when the disk formatter issues a command to a channel module; and
a buffer memory response latency.

52. The disk formatter of claim 1, wherein the latency signal generator is configured to determine the latency period based on a start sector, the current sector, a defective sector, or a masked sector.

53. The disk formatter of claim 1, wherein the latency signal generator is configured to determine the latency period based on time to load a target block register, a channel register, a buffer register, a defective sector register, and a latency register.

54. The disk formatter of claim 1, wherein the latency signal generator is configured to adjust the latency period based on a number of defective sectors on the track.

55. The disk formatter of claim 1, wherein the control module is configured to determine the command start sector such that a period between the command start sector and the current sector is equal to the latency period.

56. The disk formatter of claim 55, wherein:
the block of target sectors comprise a target start sector; and
the control module is configured to begin the read/write operation at the command start sector when the read/write head is within the latency period from the target start sector.

57. The disk formatter of claim 55, wherein:
the block of target sectors comprise a target end sector; and
the control module is configured to begin the read/write operation at the command start sector when the read/write head is (i) over the block of target sectors and (ii) at least the X sectors away from the target end sector.

* * * * *